United States Patent [19]

Kouchi et al.

[11] Patent Number: 4,868,719

[45] Date of Patent: Sep. 19, 1989

[54] REAR COMBINATION LAMP ASSEMBLY FOR VEHICLES

[75] Inventors: Takeshi Kouchi; Houichiro Kashiwabara; Osamu Waki; Koji Ohe, all of Tokyo, Japan

[73] Assignee: Stanley Electric Co., Ltd., Tokyo, Japan

[21] Appl. No.: 278,496

[22] Filed: Dec. 7, 1988

[51] Int. Cl.⁴ ............................................. B60Q 1/00
[52] U.S. Cl. ...................................... 362/61; 362/800; 362/812; 40/556; 340/478; 340/479
[58] Field of Search ................. 362/61, 80, 83, 800, 362/812, 234, 237, 240, 245; 340/461, 462, 478, 479; 40/550, 551, 556

[56] References Cited

U.S. PATENT DOCUMENTS

| 4,271,408 | 6/1981 | Teshima et al. | 362/800 X |
| 4,556,862 | 12/1985 | Meinershagen | 340/479 X |
| 4,680,678 | 7/1987 | Iwaki | 362/800 X |

Primary Examiner—Stephen F. Husar
Attorney, Agent, or Firm—Nixon & Vanderhye

[57] ABSTRACT

In a rear combination lamp assembly for a vehicle, a plurality of LEDs capable of being turned on and off independently of each other are mounted on a first printed circuit board. A plate-like lens element and a second printed circuit board are arranged with the first printed circuit board located between them. A control circuitry is mounted on the second printed circuit board, for selectively turning on and off the LEDs to display various patterns on a matrix display formed by the LEDs. The first printed circuit board, the lens element and the second printed circuit board are held in a united fashion.

15 Claims, 4 Drawing Sheets

REAR COMBINATION LAMP ASSEMBLY FOR VEHICLES

BACKGROUND OF THE INVENTION

The present invention relates to a rear combination lamp assembly adapted to be mounted to each of the opposite sides of a rear part of a vehicle body, in particular, an automobile body, the rear combination lamp assembly having incorporated therein a tail lamp, a stop lamp, a winker lamp, a back-up lamp and the like in a united fashion.

Conventionally, a rear combination lamp assembly of the kind referred to above has incorporated therein, for example, a plurality of incandescent lamp bulbs which bear functions of various lamps. The arrangement is such that a selected one or more of the lamp bulbs is or are energized to emit light, thereby turning on, through a reflector and a lens, a corresponding one of a tail lamp section, a stop lamp section, a winker lamp section and a back-up lamp section.

As described above, the arrangement of the conventional rear combination lamp assembly is such that, in actual use, a selected one or more of the lamp bulbs is or are energized to turn on a corresponding one of the tail lamp and the like. Accordingly, the conventional rear combination lamp assembly has no great difference in function from the case where various lamps are arranged separately from each other. That is, the conventional rear combination lamp assembly merely has advantages in the design aspect. If an attempt is made to freely display various patterns such as, for example, characters, symbols and the like by the use of the conventional rear combination lamp assembly, it is necessary to prepare light sources in number required to display the pattern. If incandescent lamp bulbs are employed as the light sources, such problems arise that the speed of response is slow, and rush current passes through the lamp bulbs.

SUMMARY OF THE INVENTION

It is therefore an object of the invention to provide a rear combination lamp assembly for a vehicle, in which the entire rear combination lamp assembly is utilized to enable various patterns to be displayed freely.

According to the invention, there is provided a rear combination lamp assembly for a vehicle, comprising:

a first printed circuit board having mounted thereon a plurality of LEDs capable of being turned on and off independently of each other, the LEDs cooperating with each other to form a matrix display;

a plate-like lens element arranged substantially in parallel relation to the first printed circuit board and in front of the same to cover the LEDs;

a second printed circuit board arranged on the opposite side of the first printed circuit board from the lens element and substantially in parallel relation to the first printed circuit board, the second printed circuit board having mounted thereon control circuit means for selectively turning on and off the LEDs to display various patterns on the matrix display; and holding means for holding the first printed circuit board, the lens element and the second printed circuit board in a united fashion.

Since the rear combination lamp assembly according to the invention employs the LEDs as light sources, the rear combination lamp assembly has such advantages that the service life is long, the speed of response when turned on is fast, no rush current flows, and the construction is made compact. The rear combination lamp assembly is also superior in vibration resistance and shock resistance. Further, selective energization and deenergization of the LEDs by means of the control circuit means enable desirable patterns to be displayed on the matrix display. The desirable patterns may, for example, include a pattern in which a light-emitting region on the matrix display continuously varies in area depending upon an amount of depression of a brake pedal, a sequential display pattern in which, at winker display, a light-emitting region moves with the lapse of time in the direction indicated, and a pattern formed by characters or symbols in dependence upon circumstances. Thus, the rear combination lamp assembly according to the invention is high in visibility as compared with the conventional one which is merely turned on and off. Moreover, the rear combination lamp assembly according to the invention can exactly transmit information including the running conditions of the vehicle, the driver's intention, his messages and the like, to a driver in the succeeding vehicle.

DETAILED DESCRIPTION

Figure 1:
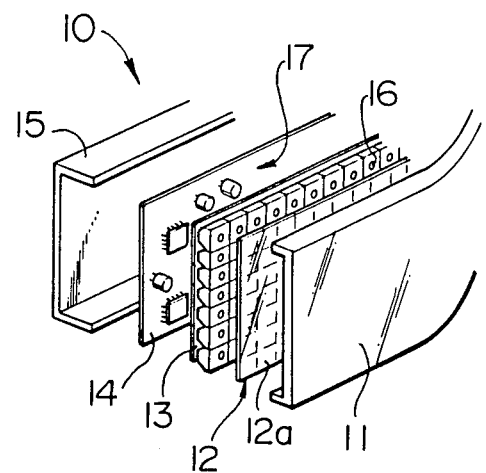
FIG. 1 is a fragmental perspective view of a rear combination lamp assembly for a vehicle, according to an embodiment of the invention.

Referring to FIG. 1, there is shown an embodiment of a rear combination lamp assembly according to the invention, which is generally designated by the reference numeral 10. The rear combination lamp assembly 10 comprises a front cover 11 through which light can be transmitted and which forms a front face of the rear combination lamp assembly 10. A plate-like inner lens element 12 is arranged in rear of the front cover 11. The inner lens element 12 extends along the back side of the front cover 11 substantially in parallel relation thereto. A first printed circuit board 13 is arranged in rear of the inner lens element 12 and extends along the back side thereof substantially in parallel relation to the inner lens element 12. A second printed circuit board 14 is arranged in rear of the first printed circuit board 13 substantially in parallel relation thereto. A rear cover 15 cooperates with the front cover 11 to form means for holding the inner lens element 12 and the first and second printed circuit boards 13 and 14, in a united fashion. That is, the rear and front covers 15 and 11 cooperate with each other to form a housing in which the components 12, 13 and 14 are accommodated.

The first printed circuit board 13 has mounted thereon a plurality of LEDs (light emitting diodes) 16 which are capable of being turned on and off independently of each other. The LEDs 16 are arranged in a regular fashion to form a matrix display 18 (see FIG. 4). The first printed circuit board 13 has also mounted thereto a plurality of tubular reflectors 16a each of which is arranged to surround a corresponding one of the LEDs 16 to direct light emitted from the LED 16 toward the inner lens element 12 substantially perpendicularly thereto, as indicated by the broken arrows in FIG. 2. Specifically, as shown in FIG. 3, each reflector 16a is formed of transparent synthetic resinous material, and is composed generally of a wall section $16a_1$ having a rectangular of square cross-sectional shape and a wall section $16a_2$ having a cross-sectional shape of a frustum of quadrangular pyramid. An angle of an outer peripheral surface of each of the wall sections $16a_1$ and $16a_2$ with respect to the LED 16 is so determined that the light from the LED 16 is total-reflected by the outer peripheral surface of the wall section $16a_1$. Thus, the outer peripheral surface of the wall section $16a_1$ serves to reflect light from the LED 16, thereby preventing the light from interfering with lights emitted from the adjacent respective LEDs surrounding the LEDs 16 in question. On the other hand, the outer peripheral surface of the wall section $16a_2$ serves to reflect the light from the LED 16 toward the inner lens element 12 (see FIG. 2) substantially perpendicularly thereto. Referring back to FIG. 2, the reflectors 16a are arranged in close relation to each other without a substantial gap left between each pair of adjacent reflectors 16a. Thus, if the entire LEDs 16 are turned on to emit their respective lights, the rear combination lamp assembly 10 can be viewed as a plane light source.

The second printed circuit board 14 has mounted thereon a control circuitry 17 for selectively turning on and off the LEDs 16 on the first printed circuit board 13.

Figure 2:
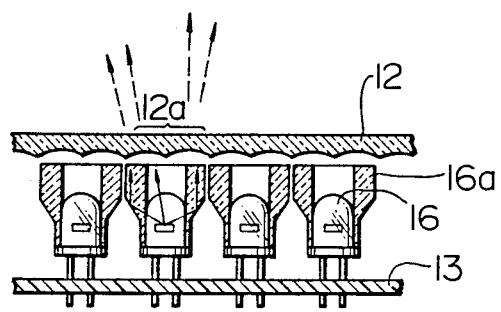
FIG. 2 is a fragmental cross-sectional view showing the relationship between an inner lens element and LEDs.
Figure 3:
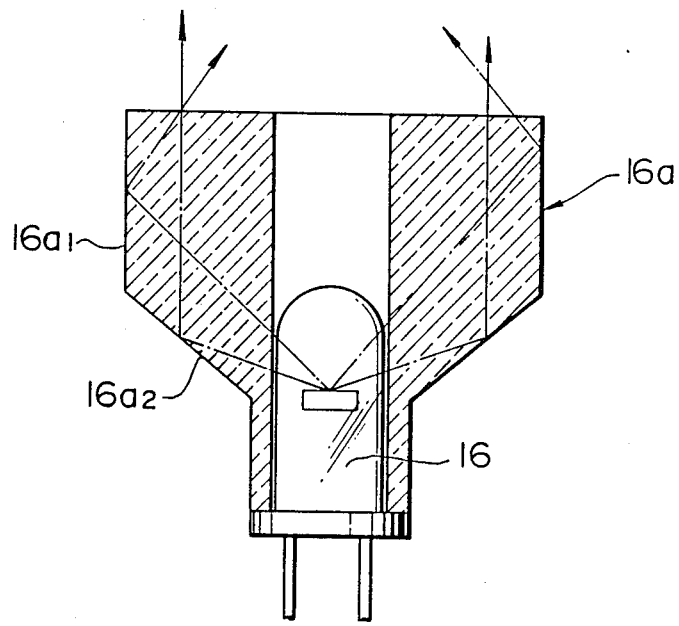
FIG. 3 is an enlarged cross-sectional view of one of reflectors for the respective LEDs shown in FIG. 2.

As shown in FIG. 2, the inner lens element 12 is formed on its back side with a plurality of lens sections 12a which are arranged in facing relation to the respective LEDs 16 mounted on the first printed circuit board 13, that is, to the respective reflectors 16a for the LEDs 16. The light emitted from each of the LEDs 16 is reflected by a corresponding one of the reflectors 16a and is guided by the same in the direction indicated by the arrows in FIG. 2. The light is dispersed by a corresponding one of the lens sections 12a of the inner lens element 12 such that the dispersed light has a suitable luminous intensity characteristic.

Figure 4:
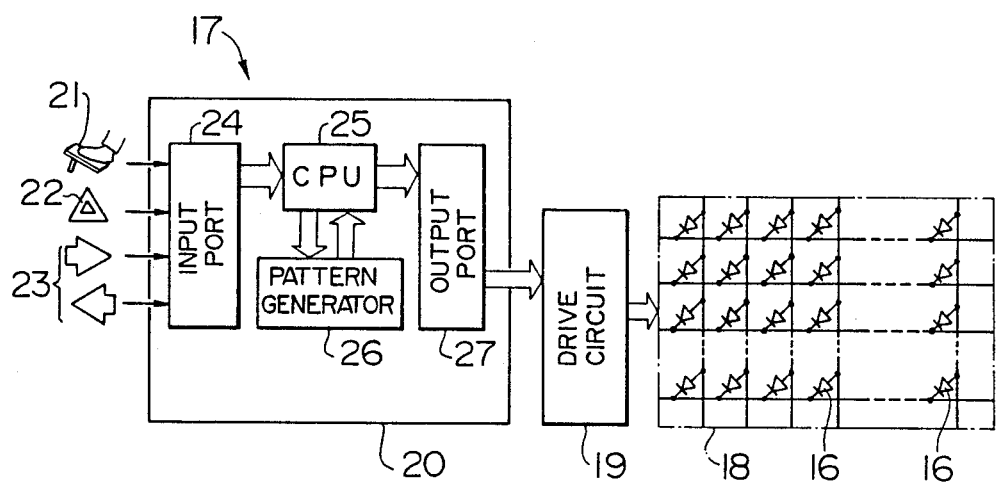
FIG. 4 is a block diagram showing a constructional example of a control circuitry in the embodiment illustrated in FIG. 1.

The control circuitry 17 mounted on the second printed circuit board 14 is constructed, for example, as shown in FIG. 4. That is, the control circuitry 17 is composed of a drive circuit 19 for driving the matrix display 18 formed by the LEDs 16, and a microcomputer 20 for suitably controlling the drive circuit 19. The microcomputer 20 includes an input port 24 and a CPU (central processing unit) 25 to which signals are inputted from a brake pedal 21, a hazard switch 22, a winker switch 23 and the like, through the input port 24. The microcomputer 20 also includes a pattern generator 26 having beforehand stored therein various patterns. The pattern generator 26 is adapted to output a display pattern signal in response to a command signal from the CPU 25. A signal from the CPU 25 is outputted through an output port 27.

The operation of the rear combination lamp assembly constructed as above will be described below.

As a signal is inputted into the microcomputer 20 of the control circuitry 17 in response to depression of the brake pedal 21, or in response to operation of the hazard switch 22, the winker switch 23 or the like, the CPU 25 reads out a display pattern signal in accordance with the inputted signal, from the pattern generator 26, and outputs the display pattern signal to the drive circuit 19. On the basis of the display pattern signal from the CPU 25, the drive circuit 19 selectively turns on and off the LEDs 16 forming the matrix display 18.

As the selected LEDs 16 are turned on by the drive circuit 19, the light from each of the LEDs 16 is brought to a substantially parallel light under the action of a corresponding one of the reflectors 16a, and is guided toward a corresponding one of the lens sections 12a of the inner lens element 12. The light is dispersed by the corresponding lens section 12a so as to have a suitable luminous intensity characteristic, and is emitted outwardly through the front cover 11.

Figure 5A:
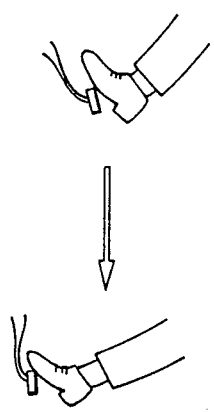
FIGS. 5a and 5b are views showing an example of a pattern displayed on a matrix display by means of the control circuitry illustrated in FIG. 4, when a brake pedal is depressed.
Figure 5B:
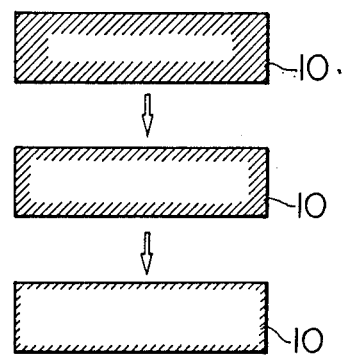
Figure 6:
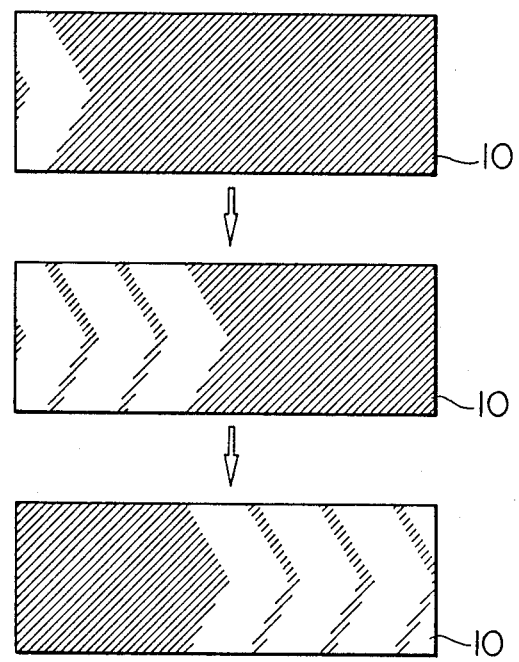
FIG. 6 is a view similar to FIG. 5b, but showing a sequential display patter at winker display.

In case of depression of the brake pedal 21, the following pattern is displayed on the matrix display 18. That is, as shown in FIG. 5a, an amount of depression of the brake pedal 21 is relatively small, a central region of the matrix display 18 first emits light as shown in FIG. 5b. As the amount of depression of the brake pedal 21 increases, the light-emitting region on the matrix display 18 increases in area and spreads out toward the periphery of the matrix display 18. In case of operation of the winker switch 23, a so-called sequential display can be done, as shown in FIG. 6, in which light-emitting regions on the matrix display 18 move with the lapse of time in the right-hand direction in the rear combination lamp assembly 10 on the right-hand side, for example. Thus, it is possible for the rear combination lamp assembly 10 to realize the winker display high in visibility as compared with the conventional one which is merely turned on and off.

Figure 7:
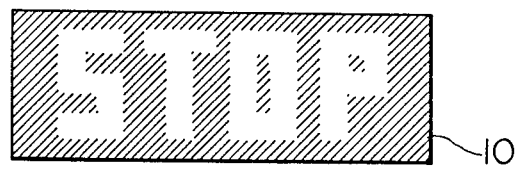
FIG. 7 is a view showing characters displayed on the matrix display at depression of the brake pedal.
Figure 8:
FIG. 8 is a view similar to FIG. 7, but showing a pattern displayed in a negative manner.

Moreover, it is possible to display characters or symbols on the matrix display 18. For example, when the brake pedal 21 is depressed, the characters "STOP" can be displayed on the matrix display 18 as shown in FIG. 7. When the hazard switch 22 is operated, the characters "HAZARD" or "HELP" can be displayed on the matrix display 18. When the winker switch 23 is operated, the characters "LEFT" or "RIGHT", or a symbol like that shown in FIG. 6 can be displayed on the matrix display 18. Further, when it is desired that the rear combination lamp assembly 10 functions as a tail lamp, any pattern such as a name or the like may be displayed on the matrix display 18. Additionally, when the pattern display such as the characters, the symbols and the like is done, the pattern can be displayed in a positive manner in which only ones of the LEDs 16 corresponding to the pattern are turned on, as shown, for example, in FIG. 7. Alternatively, the pattern can be displayed in a negative manner in which only ones of the LEDs 16 corresponding to the pattern are turned off as shown in FIG. 8.

As described above, according to the invention, it is possible not only that various lamp sections are merely turned on and off, but also that the entire rear combination lamp assembly is utilized to freely display various patterns. Further, the rear combination lamp assembly is extremely long in service life and fast in speed of response. Moreover, the rear combination lamp assembly can be made compact in structure.

What is claimed is:

1. A rear combination lamp assembly for a vehicle, comprising:
   a first printed circuit board having mounted thereon a plurality of LEDs capable of being turned on and off independently of each other, said LEDs cooperating with each other to form a matrix display;
   a plate-like lens element arranged substantially in parallel relation to said first printed circuit board and in front of the same to cover said LEDs;
   a second printed circuit board arranged on the opposite side of said first printed circuit board from said lens element and substantially in parallel relation to said first printed circuit board, said second printed circuit board having mounted thereon control circuit means for selectively turning on and off said LEDs to display various patterns on said matrix display; and
   holding means for holding said first printed circuit board, said lens element and said second printed circuit board in a united fashion.

2. A rear combination lamp assembly according to claim 1, wherein said lens element has a plurality of lens sections corresponding respectively to said LEDs, each of said lens sections being adapted to disperse light from a corresponding one of said LEDs substantially uniformly.

3. A rear combination lamp assembly according to claim 1, wherein said holding means comprises a rear cover and a front cover through which lights from the respective LEDs can be transmitted, said rear cover and said front cover cooperating with each other to form a housing in which said first printed circuit board, said lens element and said second printed circuit board are accommodated.

4. A rear combination lamp assembly according to claim 1, wherein said first printed circuit board has mounted thereto a plurality of tubular reflectors, each of said tubular reflectors being arranged to surround a corresponding one of said LEDs to direct the light from the corresponding LED toward said lens element substantially perpendicularly thereto and to prevent the light from the corresponding LED from interfering with the lights from the adjacent respective LEDs.

5. A rear combination lamp assembly according to claim 4, wherein each of said tubular reflectors has a rectangular cross-sectional shape, said tubular reflectors being arranged in close relation to each other without a substantial gap left between each pair of adjacent reflectors.

6. A rear combination lamp assembly according to claim 5, wherein each of said tubular reflectors has a generally square cross-sectional shape.

7. A rear combination lamp assembly according to claim 1, wherein said LEDs are arranged regularly on said first printed circuit board.

8. A rear combination lamp assembly according to claim 1, wherein said control circuit means comprises a memory means having stored therein said various patterns and means for reading out a selected one of said various patterns to display the selected pattern on said matrix display.

9. A rear combination lamp assembly according to claim 8, wherein said memory means comprises a pattern generator.

10. A rear combination lamp assembly according to claim 1, wherein said various patterns include a pattern in which a light-emitting region on said matrix display continuously varies in area.

11. A rear combination lamp assembly according to claim 1, wherein said various patterns include a sequential pattern in which a light-emitting region on said matrix display moves with the lapse of time.

12. A rear combination lamp assembly according to claim 1, wherein said various patterns include a pattern formed by characters.

13. A rear combination lamp assembly according to claim 1, wherein said various patterns include a pattern formed by symbols.

14. A rear combination lamp assembly according to claim 1, wherein said various patterns include a positive pattern formed by ones of said LEDs which are turned on.

15. A rear combination lamp assembly according to claim 1, wherein said various patterns include a negative pattern formed by ones of said LEDs which are turned off.

* * * * *